July 9, 1957   R. V. WOLL   2,798,646
METERING VALVE FOR USE ON CENTRALIZED LIQUID DISTRIBUTION SYSTEMS
Filed March 20, 1956   4 Sheets-Sheet 1
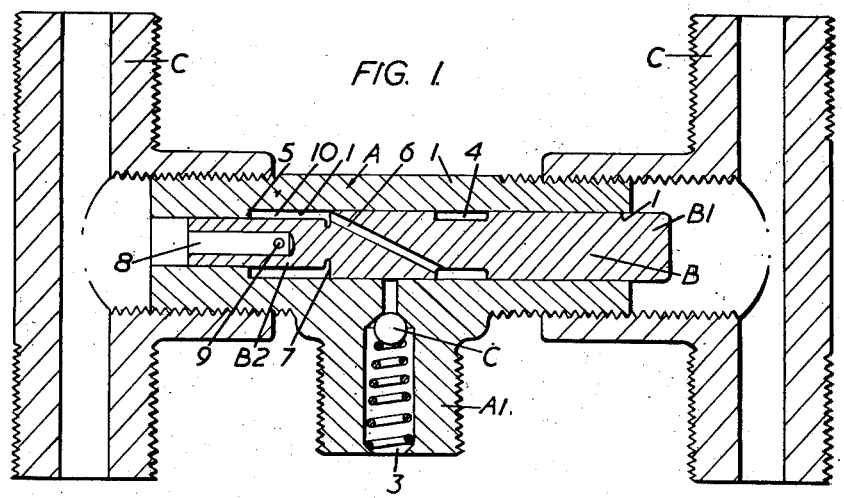
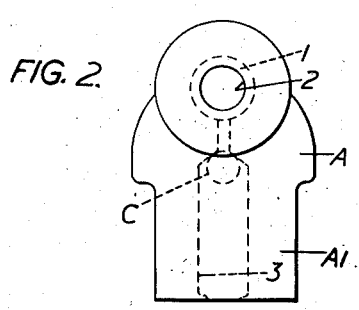
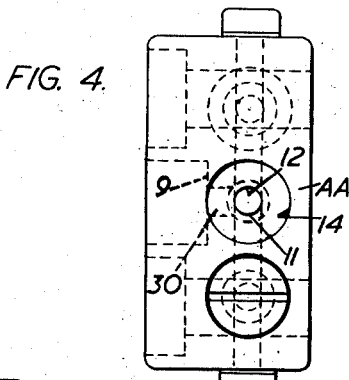
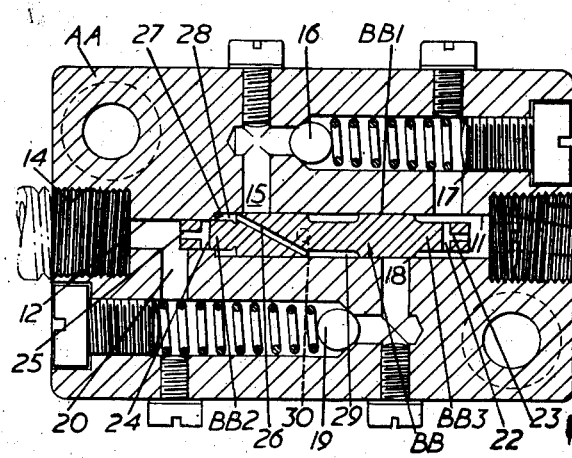
Inventor
Ronald Vincent Woll
By
Alexander Dowell
Attorneys July 9, 1957 R. V. WOLL 2,798,646
METERING VALVE FOR USE ON CENTRALIZED LIQUID DISTRIBUTION SYSTEMS
Filed March 20, 1956 4 Sheets-Sheet 2
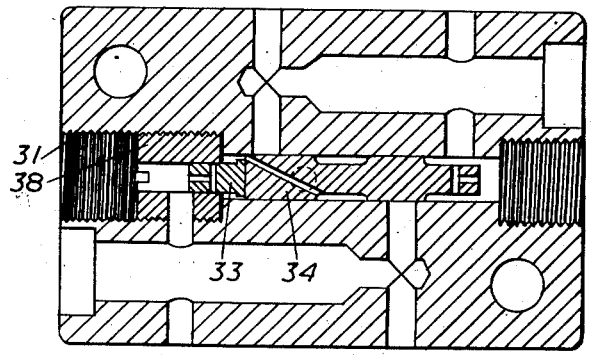
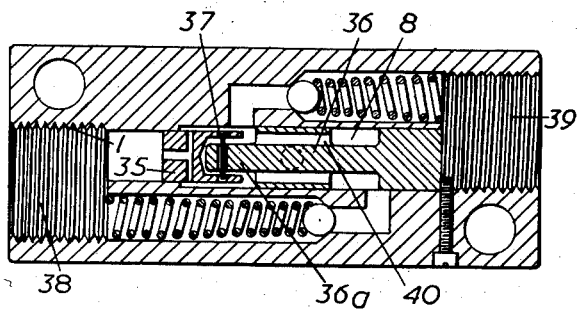
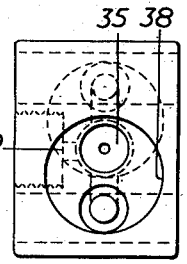
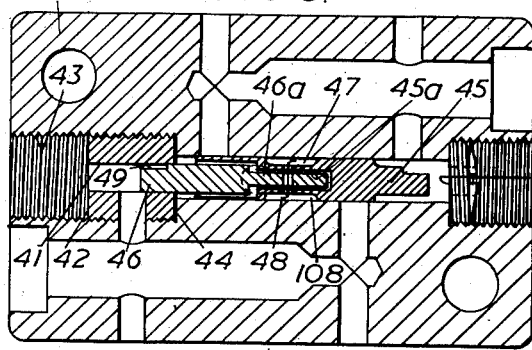
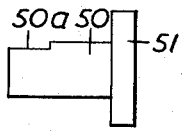
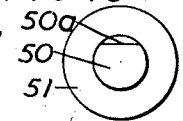
Inventor
Ronald Vincent Woll
By Alexander Dowell
Attorneys July 9, 1957 R. V. WOLL 2,798,646
METERING VALVE FOR USE ON CENTRALIZED LIQUID DISTRIBUTION SYSTEMS
Filed March 20, 1956 4 Sheets-Sheet 3

Inventor
Ronald Vincent Woll
By
Alexander Dowell
Attorneys

United States Patent Office 2,798,646
Patented July 9, 1957

2,798,646

METERING VALVE FOR USE ON CENTRALIZED LIQUID DISTRIBUTION SYSTEMS

Ronald V. Woll, Newcastle upon Tyne, England

Application March 20, 1956, Serial No. 572,673

Claims priority, application Great Britain November 4, 1954

9 Claims. (Cl. 222—250)

This invention relates to an improved metering valve for use on centralized liquid distribution systems of the kind in which there is a metering valve for each point to which the liquid is to be delivered, for example, a bearing or other moving part which has to be lubricated from a central lubricating source such as a hand or power pump connected to a lubricant reservoir on the one hand, and through a two-way flow directing valve to the opposite ends of the valve on the other hand.

Hitherto such metering valves have been made in two parts respectively arranged in laterally displaced cylinder bores, viz., a metering piston and a valve for controlling the movement of the said piston. As a number of these metering valves has to be supplied with each system according to the number of members to be lubricated, such valves become an expensive item in the system. It is the object of the invention to provide a metering valve with positive displacement but of simple construction which will have only one cylinder member.

The metering valve according to the invention comprises a cylinder member having two inter-communicating cylinders of differential diameters arranged in tandem, the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, an outlet port leading from the discharging cylinder to the desired distribution point, port means on the larger diameter portion of the slide valve means, passage means leading from the said port means to the end of the larger diameter portion of the valve means adjacent the smaller diameter portion thereof, and port means leading from the outer end of the smaller diameter portion of the valve means and adapted to communicate with the discharging cylinder when the latter has moved towards the end of the charging or priming stroke and when the port on the larger portion of the slide valve means is out of register with the outlet port.

The direction of flow of the liquid from the supply source is controlled by the two-way flow directing control valve above referred to.

The discharging stroke may be effected by a solenoid plunger which is secured to the end of the valve means remote from the priming of charging inlet end of the cylinder member, which plunger is operated by a solenoid adapted to be energised at the end of the charging stroke of the valve means. Again, such means may consist in fluid or mechanically operated means independent of the pump, and brought into operation at the end of the charging stroke of the valve means.

A visual indication of the operation of the metering valve may be effected by providing an axial extension of the piston valve. Such extension may take the form of a small diameter rod projecting from the cylinder into a frame having at its outer end an axial adjusting screw, so that in addition to an indication of the movement of the valve being obtained, the extent of its movement, and therefore of the quantity of lubricant to be dispensed, may be regulated.

When the discharging stroke is effected by solenoid, or mechanical means only one pipe line from the pump is required and this is used for priming the valves. The solenoid circuit may be combined with electric indicating means which are operated at the end of the feeding or priming stroke of the valve.

In order further to reduce the cost of manufacture, the major and minor portions of the valve may be made as separate members.

It will be seen that with the device according to the invention the valve means are virtually a combined dispensing piston and valve member. This construction, comprising, as it does, one single cylinder member and virtually one moving part only, gives a very simple and economical construction.

According to a further modified form of the invention which enables one ring main pipe line only to be used instead of two, the valve means are constructed as above set forth, but by-pass passages are formed in the cylinder casing between the charging and discharging ends respectively and the major bore, which passages respectively communicate through non-return valve-controlled ports which are uncovered by the major piston when it is at the end of its discharging and charging strokes. With this arrangement the metering valves are charged in succession, for with the valve member at the beginning of the charging stroke the lubricant forces the valve member towards the discharging end of the cylinder so filling the charging end of the cylinder until the by-pass port is uncovered whereupon the lubricant is by-passed past the non-return valve in the by-pass passage to the charging end of the next metering valve and so on until the last valve is reached whereafter the lubricant is forced through a double acting bleeder valve back to the lubricant reservoir. The flow direction valve is then reversed and lubricant is forced through the discharge end of the above last valve, so that its valve member is moved towards the charging end of the cylinder casing with the result that the lubricant therein is discharged to the bearing, after which the lubricant in the ring main is by-passed to the charging end of the casing and so to the discharging end of the next metering valve casing, and so on until it reaches the double acting bleeder valve and ultimately the reservoir.

The invention will now be described by way of example with reference to the accompanying drawings which show a number of forms of construction in connexion with centralised lubricating systems of the kind above referred to, both series or progressive and parallel or non-progressive.

In the drawings:

Fig. 1 is an axial sectional elevation of a simple form of metering valve.

Figs. 2 is an end view of Fig. 1, with the piston and ring main T-members removed.

Fig. 3 is an axial sectional elevation of a modified form of the valve shown in Figs. 1 and 2.

Fig. 4 is an end view of Fig. 3, with the piston removed.

Fig. 5 is a similar view to Fig. 3 showing a modified form of valve.

Fig. 6 is an axial sectional elevation of a further modified form of valve.

Fig. 7 is an end view of Fig. 6.

Fig. 8 is an axial sectional elevation of a still further modified form of valve.

Figs. 9 and 10 are a side and end elevation respectively of an alternative form of minor piston for the valve of Fig. 8.

Figure 11:
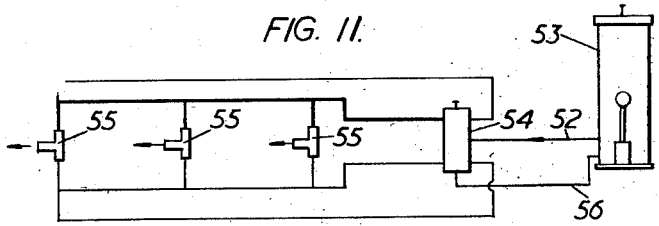
Figs. 11 to 14 are diagrammatic lay-outs of a few typical lubricating systems in which the metering valves according to the invention are used.

Referring more particularly to Figs. 1 and 2, A is a valve cylinder casing having formed therein a major cylinder 1 and a coaxial minor cylinder 2 to receive a single member differential piston type slide valve B, the large and small diameter portions of which B1, B2 are hereinafter referred to as the major and minor portions respectively. The outer ends of the cylinders 1, 2, are adapted for connexion through ring main T-piece C to the delivery side of the lubricant pump through a two-way flow control valve of the system.

Projecting laterally from the side of the cylinder casing A is a boss A1 in which is formed a transverse bore 3 which communicates with the major cylinder 1, and is adapted to be connected to the bearing to be lubricated. A non return spring pressed ball valve C is arranged in the bore 3. On the major portion B1 of the piston valve B there is an annular port 4 which is adapted to register with the outlet port 3 when the major portion B1 of the valve abuts against the shoulder 5 formed between the two cylinders. An inclined passage 6 is formed between the corresponding shoulder 7 of the piston valve and the annular port 4 therein.

The minor portion B2 of the valve is axially bored as at 8 from its outer end to communicate with a transverse bore 9 therein—or it may be slotted—the inner end of which bore or slot is positioned at a distance from the shoulder 7 so that it is uncovered only when the annular port 4 is out of register with the outlet port on the cylinder casing as shown.

In operation the oil under pressure enters the cylinder 2 pushing the piston valve B towards the cylinder 1. As the bores 8, 9 or slit minor portion B2 of the piston valve B reaches the larger cylinder 1 the fluid is accepted into the annular space 10 formed by shoulder 7 and the smaller part B2 of the piston valve in the larger cylinder 1, and passes through the passage 6 to the annular port 4. On this stroke the fluid is not able to pass out of the passage 3 to the bearing, as the port 4 is out of register with that passage. Having filled these spaces the oil exerts its full pressure on the valve B, forcing it to the end of its travel where it is arrested by an adjustable screw or the end fitting (not shown). The valve assembly is now primed, and when pressure is exerted on the opposite end of the casing, i. e. the cylinder 1 the valve B is forced back towards the cylinder 2. When the passage 9 or slit in the valve B is covered by the cylinder 2 the annular port 4 coincides with the outlet passage 3. The oil which is now trapped in annular space 10 is forced through the passage 6 in the valve B and the annular port 4 into the outlet port passage 3 and so into the bearing. The ball valve C in the passage 3 prevents oil being drawn back into the valve B again on the next priming stroke.

For correct operation the cylinders 1 and 2 must be pressurised alternately. This valve falls into the group category of twin pipe line non-progressive system.

The provision of a protruding stem on the piston, a magnetised piston or the like would externally indicate operation of the mechanism.

The valve shown in Figs. 3 and 4 is similar to that shown in Figs. 1 and 2, but modified to enable it to be used in a single pipe-line progressive system. AA is the cylinder casing and BB the piston valve, BB1 and BB2 being the major and minor portions respectively; while 11 and 12 are the major and minor cylinder bores respectively. 13 and 14 are screw threaded recesses for connecting the valve assembly in a single pipe line or ring main. Near the charging end of the major cylinder 11 is a port 15 which communicates through a check valve 16 with a port 17 leading into the discharge end of the cylinder 11. Between the ports 15 and 17 is a port 18 which communicates through a second check valve 19 with a port 20 in the minor cylinder 12.

21 is an adjustable stop having a non-coaxial bore 21a. The stop 21 arrests the piston valve BB at the end of its priming movement. The end BB3 has diametral and axial passages 22, 23 for allowing the oil to pass through the said end when it is arrested by the stop 21 respectively similar to the passages in the minor portion BB2, and indicated by 24, 25. 26 indicates the inclined passage, 27 the shoulder between the major and minor cylinders, 28 the annular space between the shoulder 27 and the major portion BB1 of the valve, and 29 the annular port on the valve BB. 30 is the lateral port communicating with the bearing to be lubricated, and it may contain a check valve to prevent the return of the oil on the following stroke.

In operation the minor cylinder 12 is first pressurized by the oil which moves the piston valve BB1 towards the major cylinder 11. As the port 24 enters the larger cylinder 11 the oil is accepted and fills the space 28, passage 26, and annular port 29 as before. The valve BB is then subjected to the full pressure in the pipe line and is forced along the cylinder to the adjustable stop 21 uncovering the port 15 along which the oil now passes, through the check valve 16, down the port 17 and into the annular space formed by the cylinder 11 and the reduced end BB3 of the valve BB. From here the oil passes through the axial passage 23 in the valve end and the bore 21a in the adjustable stop which leads into the recess 13 and the pipe line. In this operation the oil has primed the valve before by-passing it on its way along the pipe-line or ring main. When the cycle is reversed and the cylinder 11 is pressurised, flow of the oil is checked by the check valve 16. The full pressure is therefore available to move the valve BB back towards the cylinder 12 and as the passage 24 passes under the shoulder 27 the oil trapped in the annular space 28 is forced through the passage 26, the annular port 29, and the port 30, and so to the bearing. As the space 28 is reduced by the valve moving towards the cylinder 12, the annular space formed by the valve end BB3 and the major cylinder 11 registers with the by-pass port 18 so allowing the liquid to pass through the check valve 19 passage 20 and passages 24, 25 into the cylinder 12 again, and on along the pipe-line.

By locating the port 20 closer to the outer end of the minor cylinder 12 the by-passing oil can be allowed to enter the latter beyond the limit of travel of the piston valve, and thus avoid the necessity of passing the passages 24, 25, and consequently save friction losses.

If the non-return valves 16 and 19 are omitted it will be seen that the metering valves will fall into the group category of single pipe-line non-progressive system, but in such a system there would be no indication of the operation of the individual valves as is the case when valve-controlled by-pass passages are used.

Fig. 5 shows a modified form of the piston valve shown in Figs. 3 and 4, the object of which is to obviate the difficulties entailed in the coaxial boring the two coaxial cylinders for the one-piece differential piston valve shown in these drawings. These difficulties are obviated by forming the minor cylinder in a separate block 38 which is screwed into the screw-threaded recess 31 in the cylinder block which, but for the recess 32 being longer than the recess 14 of Fig. 3, is identical with the cylinder block of that drawing. The minor portion of the piston valve is made as a separate portion 33 which abuts against the end of the separate major portion 34. The block 38 may be driven into the recess 31 instead of being in threaded engagement therewith. If desired both bores may be formed non-coaxially in the one block.

Figs. 6 and 7 show another modification aimed at obviating the difficulties of coaxial boring of the two cylinders. According to this form the piston valve is in two portions again, but the cylinder bores are non-coaxial in the same block, although the minor bore may be formed in a separate block as in Fig. 5. The piston valve comprises a minor portion 35 which is recessed to receive the reduced end 36a of a major portion 36 which is loosely linked by a pin 37 to the minor portion 35. This construction allows the two portions to align automatically. For convenience of manufacture the end pipe recesses are enlarged as at 38, 39 to receive large end pipe fittings to retain the non-return or check-valve springs. As the major portion of the valve is a separate member the inclined passage may be substituted by axial passages 40.

Referring to Figs. 8 to 10 which show a further modification of the piston valve, the minor cylinder 41 is formed in a plug 42 secured in a recess 43 in the cylinder body by screw-threaded means or otherwise, to avoid the operation of coaxial boring of the major and minor portions of the cylinder. A washer 44 or the like may be used to seal one cylinder portion from the other. The major piston 45 and the minor piston 46 are separate members, the minor piston 46 being reduced at 46a at one end for insertion in a bore 45a in the major piston 45. The two pistons are linked by a pin 48 passing loosely through transverse bores in the annular port 47 and the end 46a of the piston 46, these bores thus corresponding to the inclined passage in the valves above described. To save drilling or slitting the piston ends, flats may be ground or otherwise formed as at 49 to allow the oil to pass when required. 49a is a bored stop for limiting the movement of the major piston 45.

Figs. 9 and 10 show on a larger scale an alternative minor piston 50 having a larger diameter portion 51 with a ground flat portion 50a, the smaller diameter being such as to suit the minor cylinder 41, and its larger diameter being slightly less than that of the major piston, so as to allow the oil to pass on the compression or priming stroke, but so as to act as the compression unit to force the oil to pass as soon as the flat 50a has entered the minor cylinder bore.

It will be clear that the minor cylinder formed in the separate plug 42 is also applicable to the forms already described and shown in the drawings.

Referring to Figs. 11 to 15 which show some typical lay-outs using the valves according to the invention, Fig. 11 shows a hand-operated twin pipeline non-progressive ring main system. Oil is moved down the ring main 52 from the pump 53 as indicated by the arrow, through a flow control valve 54 alternately down one side and then the other side of the metering valves 55—which are of the kind shown in Figs. 1 and 2—the depressurised side being simultaneously returned through the pipe-line 56 to relieve in the pump reservoir by the flow control valve 54.

Figure 12:
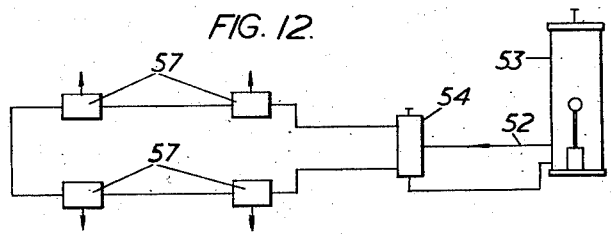

Fig. 12 shows a lay-out for a hand operated single line progressive system in which the oil leaves the pump 53, is directed along the ring main 52 by the flow control valve 54, passes through each of the valves 57—which are of the kind shown in Figs. 3 and 4—in turn and returns through the flow control valve 54 again to relieve in the pump reservoir, the valves being charged and discharged alternately by reversing the direction of flow by means of the control valve 54.

Figure 13:
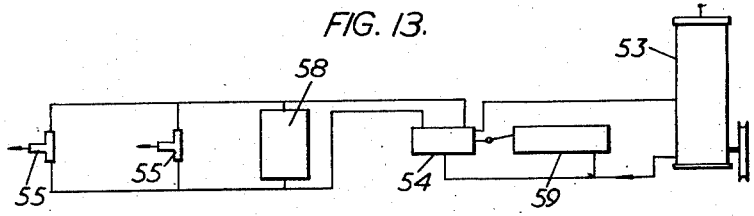

Fig. 13 shows a fully automatic twin line non-progressive system in which the oil leaving the pump 53 is directed through the flow control valve 54 and alternately down each side of each of the valves 55 and a timer 58. The automatic action is effected by means of an automatic attachment of known design which may be operated by pressure, mechanically—ratchet or rotary—or electric power. Further timing of the cycle can of course be obtained by electrical or mechanical setting of the pump etc.

Figure 14:
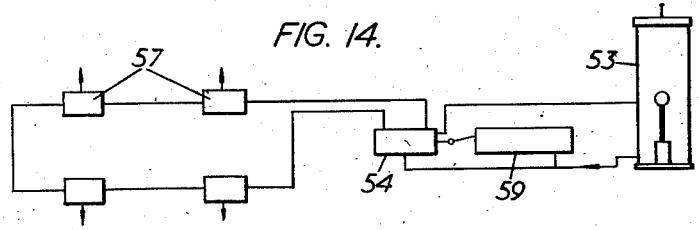

Fig. 14 shows a similar lay-out to that shown in Fig. 13 for a single line progressive system of metering valves 57.

Figure 15:
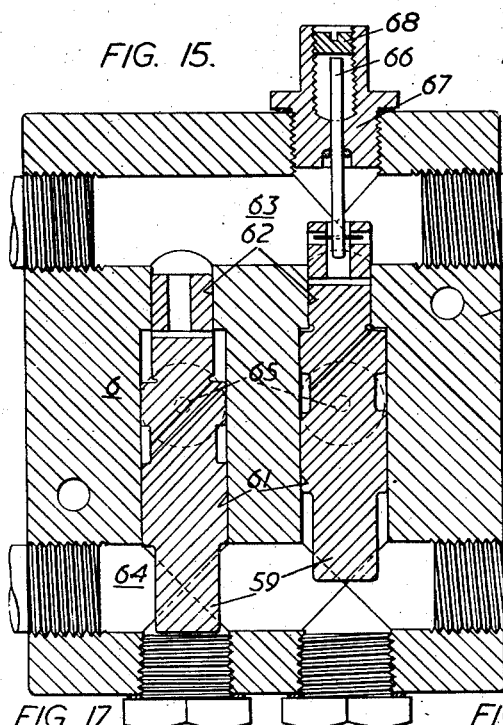
Fig. 15 is an axial sectional elevation showing two metering valves arranged in a single block in parallel or non-progressive relation.
Figure 16:
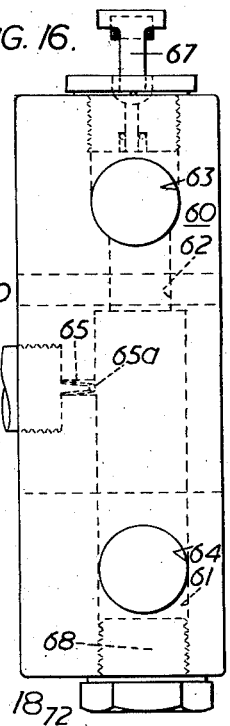
Fig. 16 is an end view of Fig. 15 with the valves omitted.

Figs. 15 and 16 show an example of manifold metering valves. This form of construction often allows a lay-out to be made more neatly and cheaply by using only one set of inlet and outlet connectors on a block manifold housing several valves each with its own outlet port. Any number of units may be incorporated into such a manifold, although for convenience two valves 59—of unit construction—only are shown. This manifold is for a non-progressive system. The valves are arranged in parallel major and minor cylinders 61, 62, in a block 60, the minor cylinders 62 opening into a common charging passage 63, and the major cylinders 61 into a common return passage 64; while each of the major cylinders has its outlet port 65 for connexion through a check valve 65a with a bearing. Obviously any of the above described piston valves may be used. The piston valves may be provided with a "telltale" in the form of a rod 66 slidably mounted in an oil-tight bushing 67 and forming a part of, or, as shown, linked to the minor portion of the valve, the bushing 67 being cut away on opposite sides so that the rod 66 is visible from the outside with a view to giving an indication that the device is operating. The length of stroke of the valve may be varied by adjusting the screw threaded stop 68.

Figure 17:
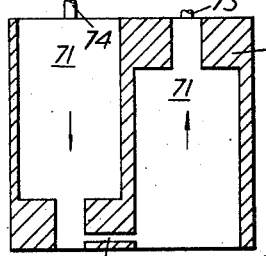
Figs. 17 and 18 are semidiagrammatic sectional elevations of a two unit and a three-unit block arranged for series or progressive relation.
Figure 18:
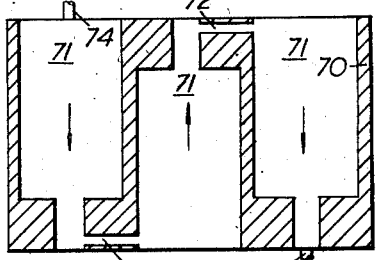

Figs. 17 and 18 show diagrammatically manifold blocks 69, 70 for two and three valves respectively for a progressive system, the cylinders 71 of which are connected in series by passages 72, while charging and return ports 73, 74 are arranged at opposite ends respectively of the blocks.

Figure 19:
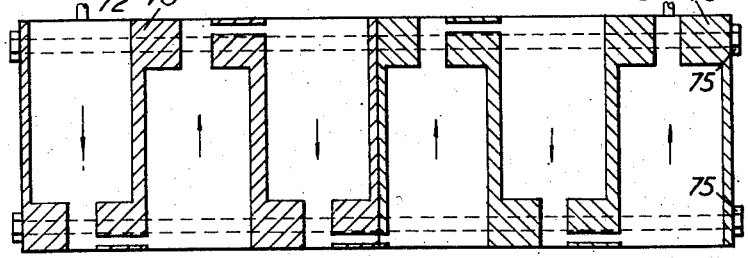
Fig. 19 is a similar view to those shown in Figs. 17 and 18 for a multi-unit block arrangement consisting of a number of unit blocks bolted together.

Fig. 19 shows two of the blocks shown in Fig. 18 bolted together with suitable washers or packing (not shown) by bolts 75 to provide a six valve unit.

In all cases the outlets from the metering valves to the bearings may have check valves as in Figs. 15 and 16, or located in the outlet fittings.

Figure 20:
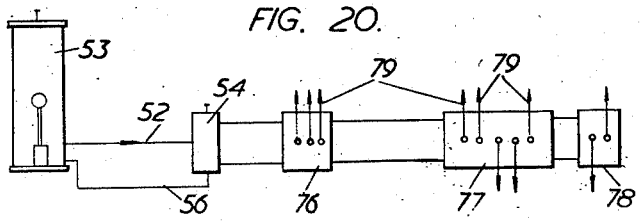
Fig. 20 is a diagrammatic lay-out of a non-progressive dual line system using manifold valves.

Fig. 20 is a diagrammatic lay-out for a number of manifold blocks of the kind shown in Figs. 15 and 16, for a non-progressive dual line system, a three-valve block 76, five-valve block 77 and two-valve block 78 being shown as separate units. The arrows 79 leading from the different blocks indicate the outlets to the various bearings. The connexions of the valves with the pipe line are the same as described in connexion with Fig. 13.

It will be seen that in all the arrangements above described, the principle of the invention remains the same, viz., priming takes place through the minor cylinder and discharging through the major cylinder.

The metering valve according to the invention allows hydraulic oil to be bled off a hydraulic system on a machine etc. and used on the lubrication system thereof, the lay-outs shown in Figs. 11 to 14 and 20 applying equally to such an arrangement with the difference that the pump is replaced by the hydraulic pressure head.

The invention also enables two liquids to be dispensed simultaneously from a twin pipe line non-progressive system, where, for example, the metering valves are located so that those required to dispense grease have their minor bores attached to the grease main, whilst those required to dispense oil have their minor bores in the oil pipe line.

Again, in a hand or mechanically operated system, a series of piston valves in their respective cylinders may be linked to a lever or other means and operated simultaneously to constitute a multiple outlet grease-gun giving each bearing a predetermined quantity of oil; or in sequence to constitute a fuel injector pump or mechanical lubricator. In both cases only one pipe line is necessary.

Instead of arranging spring-loaded ball-valves in the by-pass ports in the single line ring main valve, the piston valve itself may be spring loaded in the direction that would tend to make the major portion of the piston valve abut against the shoulder between the two cylinder bores. Alternatively, a ball valve could be arranged inside the piston member.

The equipment according to the invention is adapted for use in the distribution and metering of all liquids, for example, in addition to lubricant, printing ink on printing rollers, de-icing fluids and lubricants on wings and controls of aircraft, railway line points, signals and other mechanisms, filling bottles and other containers, sweets, chocolate and other ingredients and fillings in liquid form for confectionery, and solids in their liquid form.

I claim:

1. A metering valve for use in centralized liquid distribution systems of the kind referred to, comprising a cylinder member having two intercommunicating cylinders of differential diameters arranged in tandem, the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, a non-return valve-controlled outlet port leading from the discharging cylinder to the desired distribution point, port means on the larger diameter portion of the slide valve means, passage means leading from the said port means to the end of the larger diameter portion of the valve means adjacent the smaller diameter portion thereof, and port means leading from the outer end of the smaller diameter portion of the valve means and adapted to communicate with the discharging cylinder when the former has moved towards the end of the charging or priming stroke and when the port on the larger portion of the slide valve means is out of register with the outlet port.

2. A metering valve according to claim 1, wherein the port means on the larger diameter portion of the slide valve means consists in an annular port.

3. A metering valve for use in centralized liquid distribution systems of the kind referred to, comprising a cylinder member having two intercommunicating cylinders of differential diameters arranged in tandem, the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, a non-return valve-controlled outlet port leading from the discharging cylinder to the desired distribution point, port means on the larger diameter portion of the slide valve means, passage means leading from the said port means to the end of the larger diameter portion of the valve means adjacent the smaller diameter portion thereof, port means leading from the outer end of the smaller diameter portion of the valve means and adapted to communicate with the discharging cylinder when the former has moved towards the end of the charging or priming stroke and when the port on the larger portion of the slide valve means is out of register with the outlet port and an adjustable stop for limiting movement of the valve means.

4. A metering valve for use in single pipe-line progressive centralized liquid distribution systems of the kind referred to, comprising a cylinder member having two intercommunicating cylinders of differential diameters arranged in tandem, the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, a non-return valve-controlled outlet port leading from the discharging cylinder to the desired distribution point, port means on the larger diameter portion of the slide valve means, passage means leading from the said port means to the end of the larger diameter portion of the valve means adjacent the smaller diameter portion thereof, port means leading from the outer end of the smaller diameter portion of the valve means and adapted to communicate with the discharging cylinder when the former has moved towards the end of the charging or priming stroke and when the port on the larger portion of the slide valve means is out of register with the outlet port, a by-pass passage between the ends of the discharging cylinder and a by-pass passage between the priming cylinder and the discharging cylinder.

5. A metering valve for use in single pipe line progressive centralized liquid distribution systems of the kind referred to, comprising a cylinder member having two intercommunicating cylinders of differential diameters arranged in tandem, the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, a non-return valve controlled outlet port leading from the discharging cylinder to the desired distribution point, port means on the larger diameter portion of the slide valve means, passage means leading from the said port means to the end of the larger diameter portion of the valve means adjacent the smaller diameter portion thereof, port means leading from the outer end of the smaller diameter portion of the valve means and adapted to communicate with the discharging cylinder when the former has moved towards the end of the charging or priming stroke and when the port on the larger portion of the slide valve means is out of register with the outlet port, a by-pass passage between the ends of the discharging cylinder and a by-pass passage between the priming cylinder and the discharging cylinder, each of said by-pass passages having a non-return control valve.

6. A metering valve for use in centralized liquid distribution systems of the kind referred to, comprising a cylinder member having two intercommunicating cylinders of differential diameters arranged in tandem, the smaller cylinder being the charging or priming cylinder, and the larger cylinder the discharging cylinder, and a corresponding slide valve means in each of the said cylinders, which cylinders are adapted to communicate at their outer ends with a liquid supply source under pressure, means loosely linking said valve means together for movement in unison, a non-return valve-controlled outlet port leading from the discharging cylinder to the desired distribution point, port means on the larger diameter portion of the slide valve means, passage means leading from the said port means to the end of the larger diameter portion of the valve means adjacent the smaller diameter portion thereof, the port means leading from the outer end of the smaller diameter portion of the valve means and adapted to communicate with the discharging cylinder when the former has moved towards the end of the charging or priming stroke and when the port on the larger portion of the slide valve means is out of register with the outlet port.

7. A metering valve for use in centralized distribution systems of the kind referred to, comprising a cylinder member having two inter-communicating cylinders of differential diameters arranged in tandem, the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, the valve means in the smaller cylinder having an enlarged portion with a flattened side face at its outer end which is of only slightly less diameter than the diameter of the valve means in the larger cylinder so as to allow oil to pass on the compression or priming stroke but so as to act as a compression unit on the oil as soon as said flat has entered the smaller cylinder.

8. For use in centralized liquid distribution systems of the kind referred to, a manifold cylinder block having formed therein a number of cylinder members each having two inter-communicating cylinders of differential diameters arranged in tandem the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, a non-return valve-controlled outlet port leading from the discharging cylinder to the desired distribution point, port means on the larger diameter portion of the slide valve means, passage means leading from the said port means to the end of the larger diameter portion of the valve means adjacent the smaller diameter portion thereof, and port means leading from the outer end of the smaller diameter portion of the valve means and adapted to communicate with the discharging cylinder when the former has moved towards the end of the charging or priming stroke and when the port on the larger portion of the slide valve means is out of register with the outlet port.

9. For use in centralized liquid distribution systems of the kind referred to, a manifold cylinder block having formed therein a number of cylinder members each having two inter-communicating cylinders of differential diameters arranged in tandem, the smaller cylinder being the charging or priming cylinder, and the larger cylinder the discharging cylinder, and corresponding slide valve means in the said cylinders, said slide valve means being adapted to move in unison, which cylinders are adapted to communicate at their outer ends with a liquid supply source under pressure, a non-return valve-controlled outlet port leading from the discharging cylinder to the desired distribution point, port means on the larger diameter portion of the slide valve means, passage means leading from the said port means to the end of the larger diameter portion of the valve means adjacent the smaller diameter portion thereof, port means leading from the outer end of the smaller diameter portion of the valve means and adapted to communicate with the discharging cylinder when the former has moved towards the end of the charging or priming stroke and when the port on the larger portion of the slide valve means is out of register with the outlet port, and means interconnecting said cylinder members together for progressive operation.

No references cited.